Feb. 20, 1968     T. F. KEATING     3,369,783
MACHINE SUPPORT
Filed Feb. 24, 1966
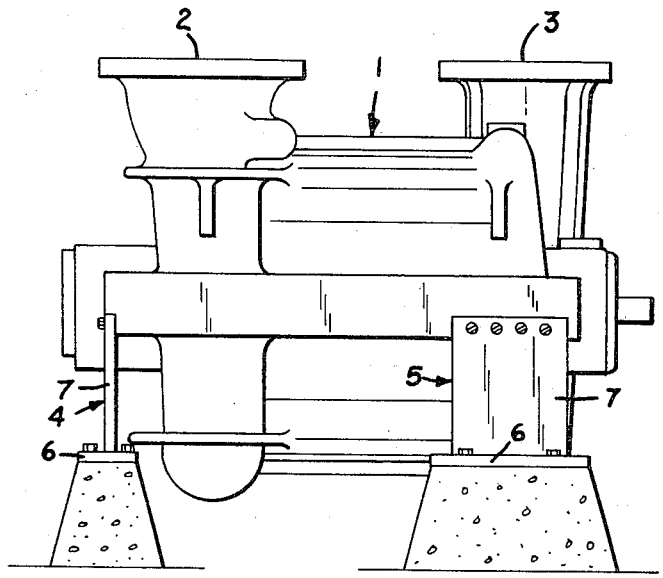
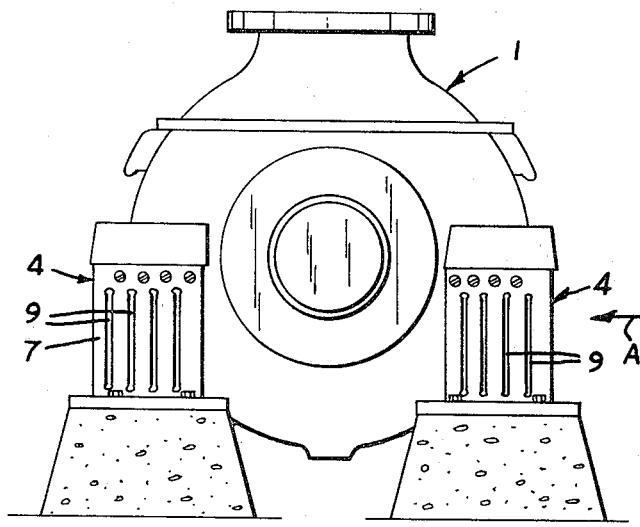
INVENTOR.
THOMAS F. KEATING.
BY J. Raymond Curtin
ATTORNEY.

3,369,783
MACHINE SUPPORT
Thomas F. Keating, Jeannette, Pa., assignor to Carrier
Corporation, Syracuse, N.Y., a corporation of Delaware
Filed Feb. 24, 1966, Ser. No. 529,850
2 Claims. (Cl. 248—19)

ABSTRACT OF THE DISCLOSURE

A support system for a machine subject to thermal expansion and contraction comprising a first pair of upstanding planar legs adapted for connection to one end of the machine with the planar section of the legs oriented parallel to the machine axis so as to allow expansion or contraction of the machine in a direction perpendicular to the machine axis and a second pair of upstanding planar legs adapted for connection to the other end of the machine with the planar section of the legs oriented perpendicular to the machine axis so as to allow expansion or contraction of the machine in a direction parallel to the machine axis. A plurality of parallel slits in the second pair of legs add flexibility thereto so as to compensate for thermal expansion and contraction of the machine in a direction perpendicular to the machine axis.

---

This invention relates to machine supports. More particularly, this invention relates to supports which allow the supported machine to expand in a direction transverse to the axis of the supports while maintaining machine position in a direction along the axis of the supports. Still more particularly, this invention relates to supports which will permit machine growth in both directions while maintaining sufficient stiffness in the support to hold the machine in the desired position.

Many machines, for example multi-stage gas compressors, are subjected to large temperature variations. This causes the machine to expand or contract, depending on the temperatures involved, creating thermal stresses. To compensate for machine growth or shrinkage, special supports are employed to allow machine expansion and contraction without putting extreme stresses on the machine or the supports. In the case of a multi-stage compressor, the major expansion or contraction occurs along the axial dimension of the compressor. Supports are, therefore provided that are flexible in a direction along the axis of the compressor to allow for this expansion or contraction while maintaining the machine stationary in a direction transverse to the machine axis to insure proper alignment of the shaft of the prime mover. It is obvious, however, that the machine will also be subject to growth or shrinkage in the transverse direction, albeit to a lesser degree. Under ordinary circumstances, the fact that the supports do not compensate for growth in this direction is unimportant as the stresses set up in the machine and or supports are minor. Under extreme conditions, however, such as where compressors are utilized in ethylene or propylene service where the compressors are subjected to inlet temperatures ranging from −40° F. to −150° F., the bending stresses at the compressor inlet transverse to the machine axis are excessive.

It is, therefore, the chief object of this invention to provide an improved machine support system. It is a further object of this invention to provide a system which will permit machine growth or shrinkage in both an axial and transverse direction while maintaining sufficient stiffness in the support to hold the machine in the desired position.

These objects are attained by providing machine supports having base sections and upstanding planar sections for attachment to the machine. The supports at one end of the machine are oriented so that the direction of greatest machine growth or shrinkage is perpendicular to the plane of the upstanding sections, in which direction the supports are most flexible. The supports at the other end of the machine are oriented so that the planes of the upstanding sections are parallel to the machine axis. Slits, perpendicular to the base sections of the supports having the planes of the upstanding sections perpendicular to the machine axis, are provided in the upstanding sections to allow a slight flexibility in the plane of the upstanding sections perpendicular to the slits. The slits extend from a location near the base sections to a location in close proximity to the top of the upstanding sections.

SUMMARY OF THE INVENTION

In accordance with the preferred embodiment of the invention, a machine support is provided having two upstanding planar legs disposed parallel to the machine axis at one end of the machine and two upstanding planar legs having a plurality of vertical parallel slits formed therein disposed at the other end of the machine perpendicular to the axis of the machine to compensate for thermal expansion and contraction of the machine.

FIGURE 1 is a side view of a compressor having improved supports of my invention; and FIGURE 2 is an end view of the compressor illustrated in FIGURE 1.

Referring more particularly to the drawing, there is shown a fluid handling machine such as a compressor 1 having an inlet end 2 and an outlet end 3. The compressor is supported on machine supports 4 and 5 in turn supported on a foundation or the like. Supports 4 and 5 are comprised of base sections 6 and upstanding planar sections 7. The compressor 1 is bolted to the tops of upstanding planar sections 7. The sections 7 of supports 4 have a plurality of slots 9 therein to provide limited flexibility of the support in the directions indicated by the arrow A. The supports 4 and 5 are flexible in the directions perpendicular to the plane of the upstanding sections 7 due to the fact that the planar sections 7 have a relatively thin cross-section.

Thus, it can be seen that the supports accommodate machine growth or shrinkage without imposing excessive stresses in the machine or the support. The slits have a negligible effect on the strength of the supports 4 but contribute greatly to their flexibility in the A directions. The flexibility in the A direction can be increased or decreased by changing the number, location, or length of the slits. Similarly, the stiffness in the A direction can be increased or decreased by varying the thickness of the upstanding section, the width of the upstanding section in the A direction, or by multiple upstanding sections. In other words, there is a control of both stiffness and flexibility in both directions.

The machine support system illustrated in FIGURES 1 and 2 provides optimum support for the compressor 1. The supports 5 having the plane of the upstanding section 7 parallel to the axis of the compressor maintain the compressor in the desired axial position. The flexibility of the supports 5 in a direction perpendicular to the plane of upstanding sections 7 allows for radial growth or shrinkage of the compressor. The supports 4 which have the plane of their upstanding section 7 perpendicular to the axis of the compressor allow the compressor 1 to expand or contract axially due to the flexibility of the supports 4 perpendicular to the plane of the upstanding sections 7. The supports 4 being relatively stiff in a direction transverse to the axis of the compressor maintain the compressor in the proper position transverse to the machine axis. Since the supports 4 are stressed in a direction transverse to the machine axis when the machine expands or contracts radially due to temperature variations therein, the slits 9 are provided in the upstanding sections 7 to allow a minimum flexibility in the A direction to minimize the stresses. From the foregoing, it can be seen that the compressor 1 is solidly supported in the desired position and is free to expand or contract due to temperature variations without undue stress in the supports or the compressor.

While I have described a preferred embodiment of my invention, it is to be understood that the invention is not limited thereto since it may be otherwise embodied within the scope of the following claims.

I claim:

1. A machine support system subject to stresses due to thermal expansion and contraction of the machine comprising:

first and second legs having means for rigid connection thereof to one end of the machine, each of said legs having a base section and an upstanding planar section solidly affixed to said base section, each said upstanding planar section having at least one slit therein perpendicular to said bottom section to increase the flexibility thereof in a direction perpendicular to the slit, said first and second legs having the planar sections thereof perpendicular to the machine axis; and third and fourth legs having means for rigid connection thereof to the other end of the machine, each of said third and fourth legs having a base section and an upstanding planar section solidly affixed to said base section, said third and fourth planar sections having the planar sections thereof parallel to the machine axis.

2. A support according to claim 1 wherein the slits in each of said first and second legs extend from the location near the base section of the leg to a location near the top of said upstanding section.

References Cited

UNITED STATES PATENTS 2,128,805  8/1938  Doran _____ 248—2 X
2,443,054  6/1948  Putz.

FOREIGN PATENTS 590,190  1/1960  Canada.

JOHN PETO, *Primary Examiner.*